United States Patent
Li et al.

(10) Patent No.: US 7,124,001 B2
(45) Date of Patent: Oct. 17, 2006

(54) RELATIVE ATTITUDE ESTIMATOR FOR MULTI-PAYLOAD ATTITUDE DETERMINATION

(75) Inventors: Rongsheng Li, Hacienda Heights, CA (US); Hanching Grant Wang, Hacienda Heights, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 10/877,442

(22) Filed: Jun. 25, 2004

(65) Prior Publication Data

US 2005/0010337 A1    Jan. 13, 2005

Related U.S. Application Data

(60) Provisional application No. 60/486,626, filed on Jul. 11, 2003.

(51) Int. Cl.
*G05D 1/00* (2006.01)
*G05D 1/08* (2006.01)

(52) U.S. Cl. ............ 701/4; 701/1; 701/13; 356/139.03; 244/158.1; 244/164; 244/171

(58) Field of Classification Search ................ 701/1–4, 701/13, 200, 226; 342/352, 357.11; 356/139.03; 244/158.1, 164, 171
See application file for complete search history.

(56) References Cited

U.S. PATENT DOCUMENTS

| | | | | |
|---|---|---|---|---|
| 5,104,217 A | * | 4/1992 | Pleitner et al. | ................. 356/2 |
| 5,587,714 A | * | 12/1996 | Chu et al. | .................... 342/354 |
| 5,831,572 A | * | 11/1998 | Damilano | .................... 342/352 |
| 6,595,469 B1 | * | 7/2003 | Li et al. | ................... 244/158.1 |

* cited by examiner

*Primary Examiner*—Y. Beaulieu
(74) *Attorney, Agent, or Firm*—Gates & Cooper LLP (57) ABSTRACT

A method and apparatus for estimating a slave payload attitude is disclosed. The method includes accepting a plurality of slave payload attitude measurements, deriving a model of the relative attitude of the slave payload and a master payload attitude at least in part from the plurality of slave attitude measurements, predicting the relative attitude between the slave payload attitude and the master payload attitude using the derived model, and estimating the relative attitude between the slave payload attitude and the master payload attitude at least in part from the predicted relative attitude between the slave payload attitude and the master payload attitude. Furthermore, the absolute attitude of the slave payload is computed using the relative attitude and the master payload attitude.

33 Claims, 10 Drawing Sheets

RELATIVE ATTITUDE ESTIMATOR FOR MULTI-PAYLOAD ATTITUDE DETERMINATION

CROSS-REFERENCE TO RELATED APPLICATIONS

This application claims benefit of U.S. Provisional Patent Application No. 60/486,626, entitled "RELATIVE ATTITUDE ESTIMATOR FOR MULTI-PAYLOAD ATTITUDE DETERMINATION," by Rongsheng Li, Hanching G. Wang and Yeong-Wei A. Wu, filed Jul. 11, 2003, which application is hereby incorporated by reference herein.

This application is also related to U.S. Pat. No. 6,595,469, entitled "ATTITUDE CONTROL METHODS AND SYSTEMS FOR MULTIPLE-PAYLOAD SPACECRAFT," by Rongsheng Li, Yeong-Wei A. Wu and Hanching Grant Wang, issued Jul. 22, 2003, which is hereby incorporated by reference herein.

BACKGROUND OF THE INVENTION

1. Field of the Invention

The present invention relates to systems and methods for spacecraft navigation and control, and in particular to a system and method for determining the attitude of spacecraft payloads.

2. Description of the Related Art

Satellites and other spacecraft often include multiple payloads, one or more of which can have high-precision pointing requirements. The attitude of the spacecraft can be accurately derived using data obtained from a plurality of different attitude sensors, such as gyros, earth-limb sensors, sun sensors, and star sensors. However, even if the nominal attitude of the payload relative to the spacecraft is known apriori, actual payload attitude cannot be accurately derived in many cases due to deviations from the nominal spacecraft-payload interface. Such deviations can be caused, for example, by payload thermal deformation which occurs as the spacecraft orbits the Earth.

What is needed is a system and method that permits the accurate determination of the attitude of spacecraft payloads, even when subject to payload thermal deformation. What is also needed is that the system and method be implemented at a minimal cost to spacecraft computer throughput and memory.

The present invention satisfies that need.

SUMMARY OF THE INVENTION

To address the requirements described above, the present invention discloses a method and apparatus for estimating a slave payload attitude. The method comprises the steps of accepting a plurality of slave payload attitude measurements, deriving a model of the relative attitude of the slave payload and a master payload attitude at least in part from the plurality of slave attitude measurements, predicting the relative attitude between the slave payload attitude and the master payload attitude using the derived model, and estimating the slave payload attitude at least in part from the predicted relative attitude between the slave payload attitude and the master payload attitude.

The apparatus comprises a sensor processing module for accepting a plurality of slave payload attitude measurements, a relative attitude model parameter estimator, communicatively coupled to the sensor processing module, for deriving a model of the relative attitude of the slave payload attitude and a master payload attitude at least in part from the plurality of slave attitude measurements, a predictor module, communicatively coupled to the relative attitude model parameter estimator, for predicting the relative attitude between the slave payload attitude and the master payload attitude using the derived model, and an estimator module, communicatively coupled to the predictor module and the sensor processing module, for estimating the relative attitude between the slave payload attitude and the master payload attitude at least in part from the predicted relative attitude between the slave payload attitude and the master payload attitude. The estimated relative attitude can be used for mechanically gimbaling an antenna, electronic beam steering, and phase array steering to compensate the attitude error of slave payload. Furthermore, the absolute attitude of the slave payload can be computed using the relative attitude and the master payload attitude.

The relative attitude estimator estimates the relative attitude between a "slave channel" attitude determination sensor and a "master channel" attitude determination sensor. The relative attitude estimator output allows "slave channel" measurements to be corrected to be consistent with the "master channel" and consequently used to improve the determination of the attitude of the master payload. The relative attitude estimator output also allows the absolute attitude of each of the slave payloads to be derived using the master payload absolute attitude and the relative attitudes of each of the other payloads.

The relative attitude estimator is also computationally economical. Most processor-intensive computations, such as matrix pseudo-inverse computations, are performed with a matrix that is known apriori, and hence, can be performed in advance, and do not require significant computer resources on board the spacecraft. The relative attitude estimator also includes sufficient flexibility to accommodate a wide variety of slave payloads, each with different relative attitude profiles (e.g. due to different thermal deformation), as well as a variety of pointing requirements for each slave payload.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
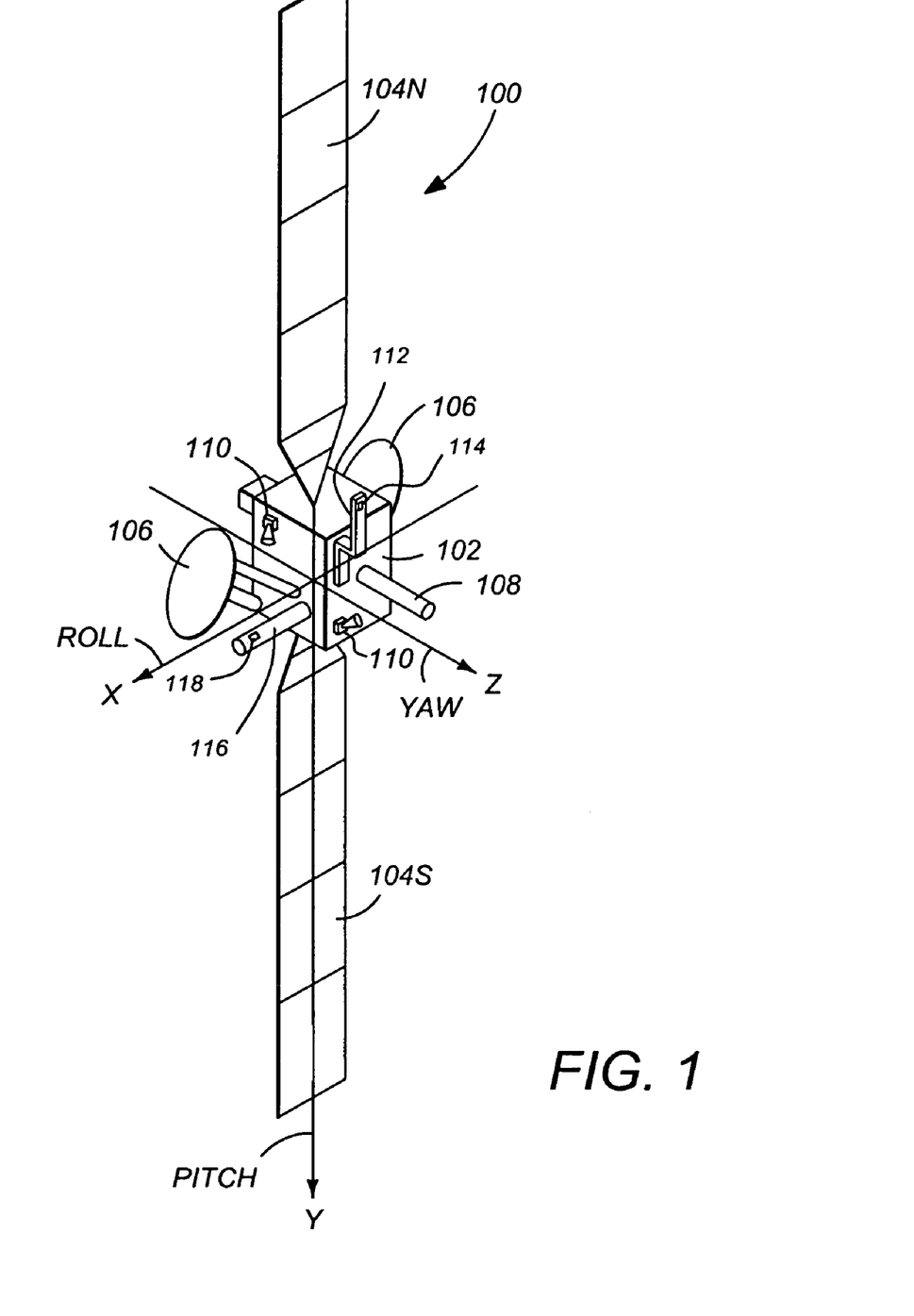
FIG. 1 is a diagram illustrating a spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Z.

The spacecraft 100 also includes two or more payloads 112 and 116, each having an attitude sensor 114 and 118. Attitude sensors 114 and 118 are disposed on the payload 112 and 116, respectively, so as to measure the attitude of the payloads 112 and 116.

Figure 2:
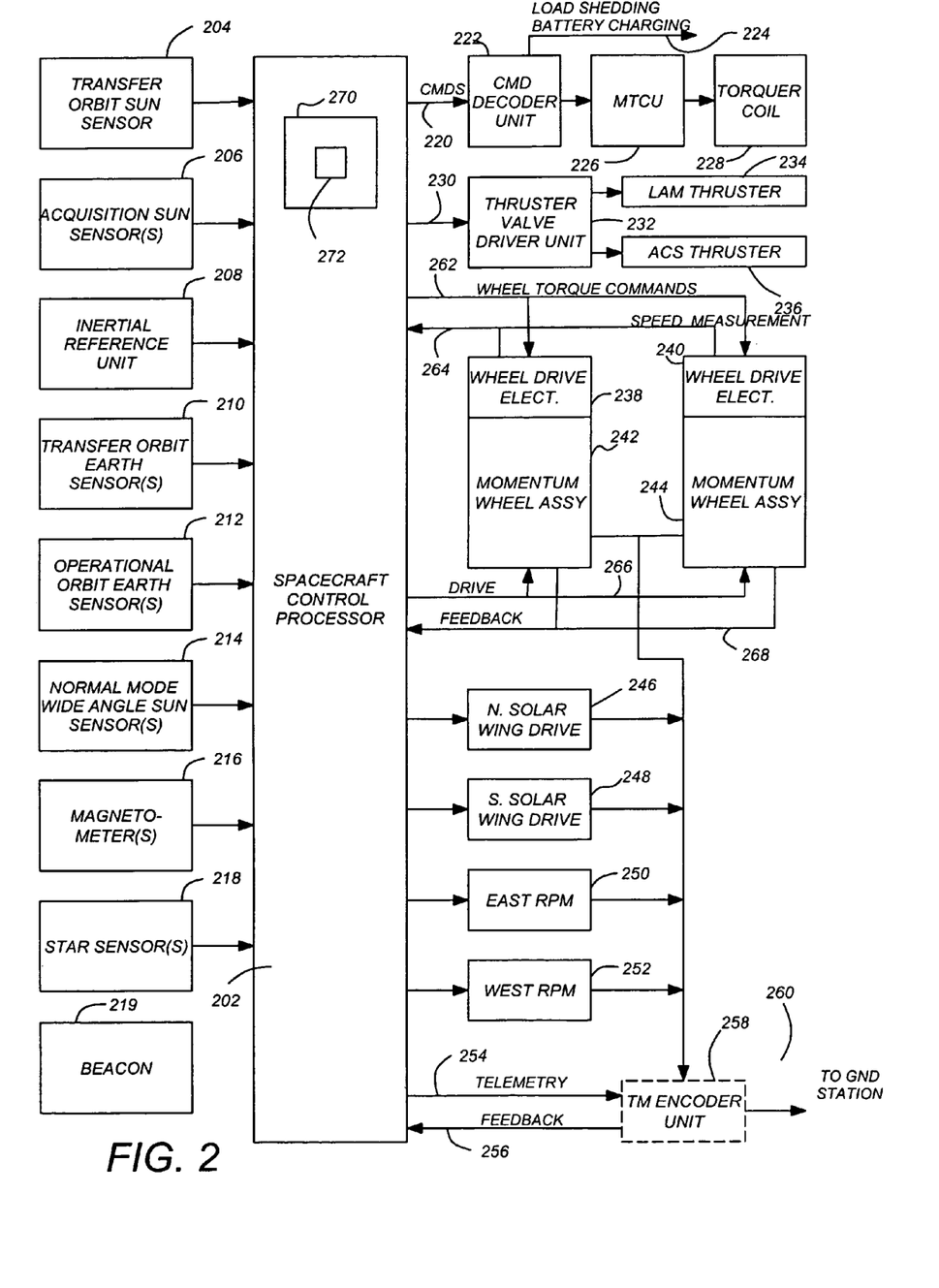
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, one or more star sensors 218, and/or a beacon sensor 217. The use of such beacon sensors 217 is discussed in co-pending and commonly assigned patent application Ser. No. 10/371,141, for "PHASED ARRAY POINTING DETERMINATION USING INVERSE PSEUDO-BEACON," filed Feb. 20, 2003, by Ketao Liu and Paul Wemtz, and application Ser. No. 10/319,273, for "DIGITAL BEACON ASYMMETRY AND QUANTIZATION COMPENSATION", filed Dec. 13, 2002, by Hanching G. Wang and Chih-Chien Hsu, both of which applications are hereby incorporated by reference.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
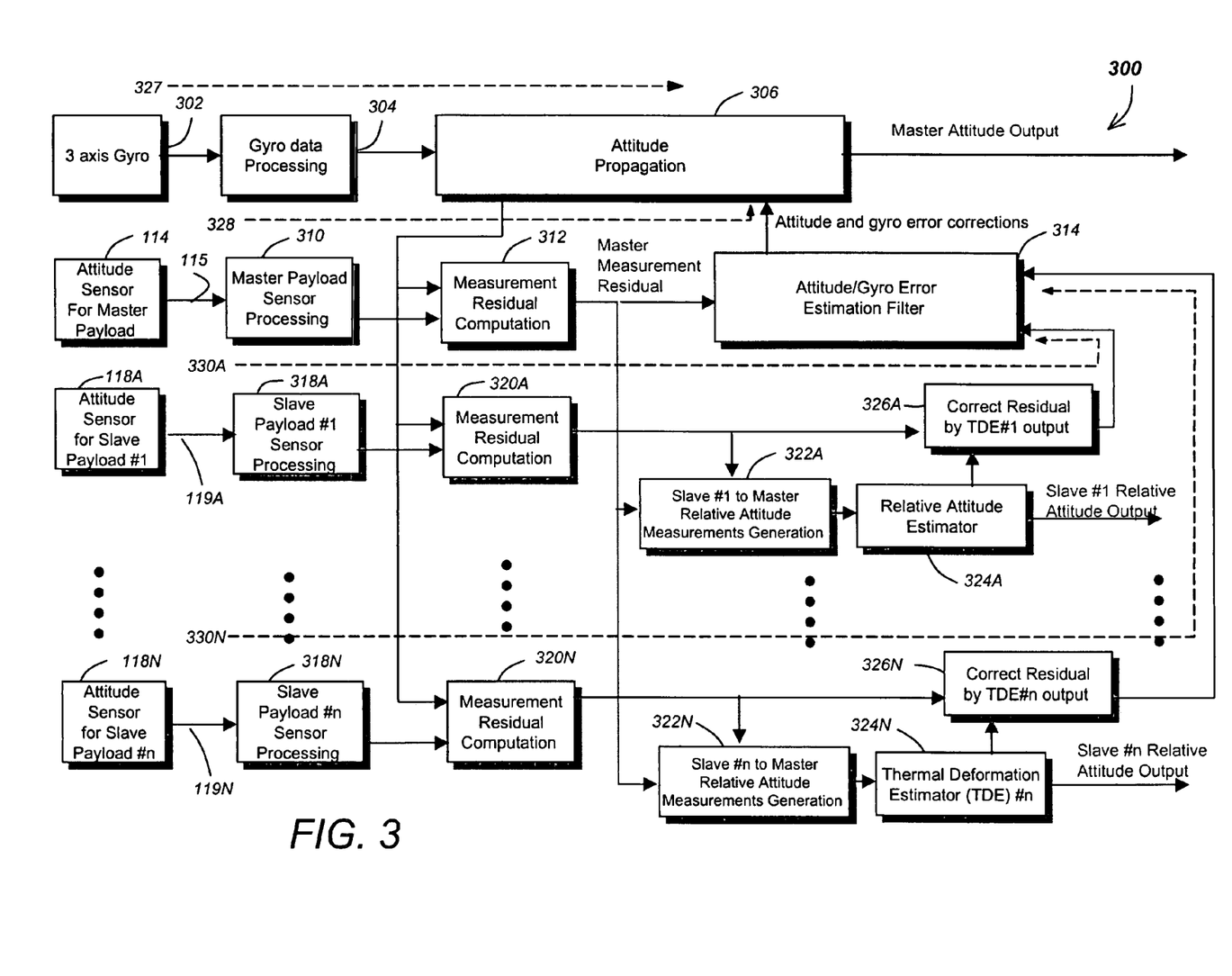
FIG. 3 is a diagram depicting the architecture of an exemplary multi-payload attitude determination system.

FIG. 3 is a diagram depicting the architecture of a multi-payload attitude determination system (MPADS) 300. In the MPADS 300, one or more attitude sensors are used with payloads where attitude knowledge of the payload is required. This may be the case, for example, with payloads having high pointing accuracy requirements and that are subject to significant thermal deformation as well. Such attitude sensors can include, for example, star-trackers, sun-sensors, earth sensors, beacon sensors, or a 3-axis gyro.

A spacecraft 100 may have several of these payloads, and any one of these payloads can be designated as a master payload, which is chosen as a reference. If the spacecraft includes a 3-axis gyro, it may be desirable to include the 3-axis gyro as a part of the sensor set for the master payload. The remaining payloads are designated as slave payloads.

The multi-payload attitude determination system (MPADS) 300 comprises a first processing path 327. The first processing path includes an attitude sensor 302. In one embodiment, the attitude rate sensor is a rate sensor such as a three-axis rate gyro. For purposes of description, the attitude sensor 302 will be referred to hereinafter as the three-axis rate gyro. The three-axis gyro 302 can be implemented in the inertial reference unit (IRU) 208, for example. Measurement data from the 3-axis gyro 302 are processed by a gyro data processor 304, and thereafter provided to an attitude propagation module 306. The attitude propagation module 306 propagates processed attitude rate information from the attitude sensor 302, while accounting for attitude and gyro error correction information obtained from other attitude sensors, to produce a master attitude output. The attitude propagation module also provides data for measurement residual computations in payload loops 328 and 330A–330N, as described below.

The MPADS 300 includes a master payload loop 328, and one or more slave payload loops 330A–330N. The master payload and slave payload loops 328, 330A–330N use payload sensor 114, 118A–118N information to compute measurement residuals that are used to generate attitude and gyro error corrections that are supplied to the attitude propagation module 306. Master payload loop residuals are corrected by residuals from the slave payload loops 330A–330N.

The master payload loop 328 includes a master payload attitude sensor 114. The master payload attitude measurements 115 are processed by processing module 310, and provided to a master payload loop measurement residual module 312. The master payload loop measurement residual module 312 computes measurement residuals from the difference between the "predicted" master payload attitude measurement based on the estimated master payload attitude (obtained from the attitude propagation module 306), and the "measured" master payload attitude measurements (obtained from the processed measurements of master payload attitude sensor 114). These residuals are provided to the attitude/gyro estimation filter 314, which generates attitude and gyro error corrections from the master payload loop measurement residuals and slave payload loop measurement residuals corrected to account for thermal deformation, as described below.

The slave payload loop 330A includes a related slave payload attitude sensor 118A. Module 318A processes the slave payload attitude sensor 118A measurements 119A, and provides the processed measurements to a slave measurement residual computer 320A. The slave measurement residual computer 320A computes slave measurement residuals from the difference between the "predicted" slave payload attitude sensor measurement based on the master payload attitude and the processed "measured" slave payload attitude sensor measurements from the slave payload sensor 318A. These residuals are corrected by the relative attitude corrector module 326A and provided to the estimation filter 314A.

Master payload measurement residuals and measurement residuals for the slave channel 330A are provided to a slave-to-master relative attitude measurement generator 322A. The slave-to-master relative attitude generator 322A computes the relative attitude between the slave payload and the master payload from the master measurement residuals and the slave measurement residuals. This relative attitude is provided to the relative attitude estimator 324A, which may also include a thermal deformation estimator, or TDE. The relative attitude estimator 324A computes the relative attitude between the slave payload 116 and the master payload 112. This information is provided to the relative attitude corrector 326A.

As shown in FIG. 3, the MPADS 300 may include a plurality of slave loops (e.g. 330A–330N), each including the elements described above, including slave payload sensors (118A–118N), slave payload sensor processing modules 318A–318N, measurement residual module 320A–320N, slave to master relative attitude measurement generators 322A–322N, relative attitude estimators 324A–324N, and relative attitude corrector modules 326A–326N.

The attitude/gyro error estimation filter 314 uses the measurement residuals from the master attitude sensor and the slave attitude sensors and produces an estimated attitude estimate correction and estimated gyro error corrections. The estimator 314 can be a 6 state Kalman filter that produces a three state attitude estimate correction and a three state gyro bias estimate correction; a 15-state Kalman filter that produces a three state attitude estimate, a three state gyro bias correction estimate, and a 3 state gyro scale factor and 6 state gyro misalignment correction; or a 6 state Kalman filter that produces a three state attitude estimate correction, a three state gyro bias estimate correction, with fixed gains or variable gains produced by gain computation algorithm that is not based on Kalman filter equations.

Figure 4:
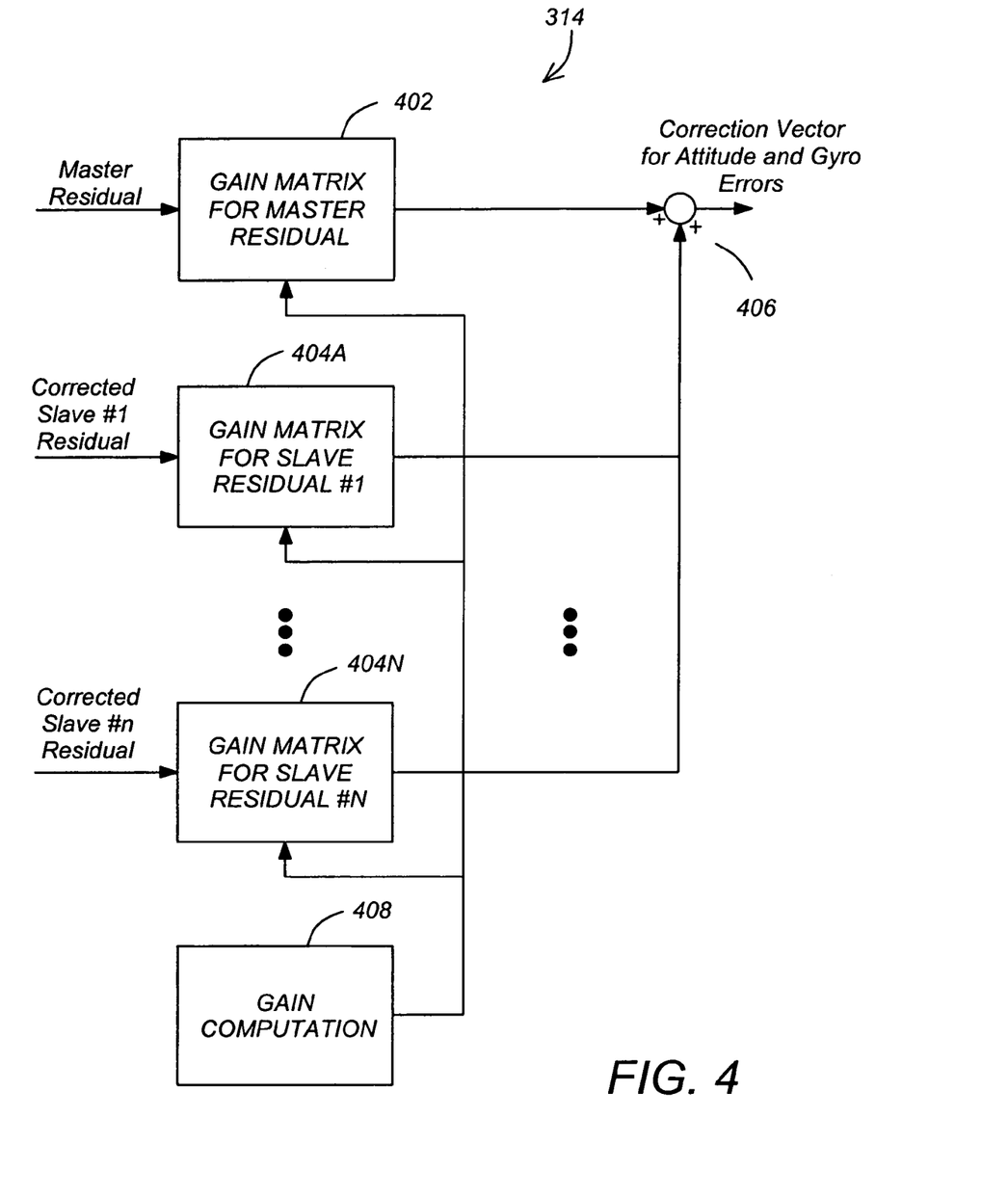
FIG. 4 is a block diagram of one embodiment of the attitude/gyro error estimation filter.

FIG. 4 is a block diagram of one embodiment of the architecture of the attitude/gyro error estimation filter 314

(hereinafter alternatively referred to as the estimation filter). The estimation filter 314 applies the master payload loop 328 measurement residuals from the measurement residual module 312 to a master residual gain matrix 402, and provides the result to a summer 406. Corrected slave channel residuals from the relative attitude correctors 326A–326N are provided to slave residual gain matrices 404A–404N, and the result is likewise provided to the summer 406. The summer adds the output of the gain-matrix modified residuals to produce a correction vector for the attitude and gyro errors. The gain matrix values are determined by gain computation module 410.

Figure 5:
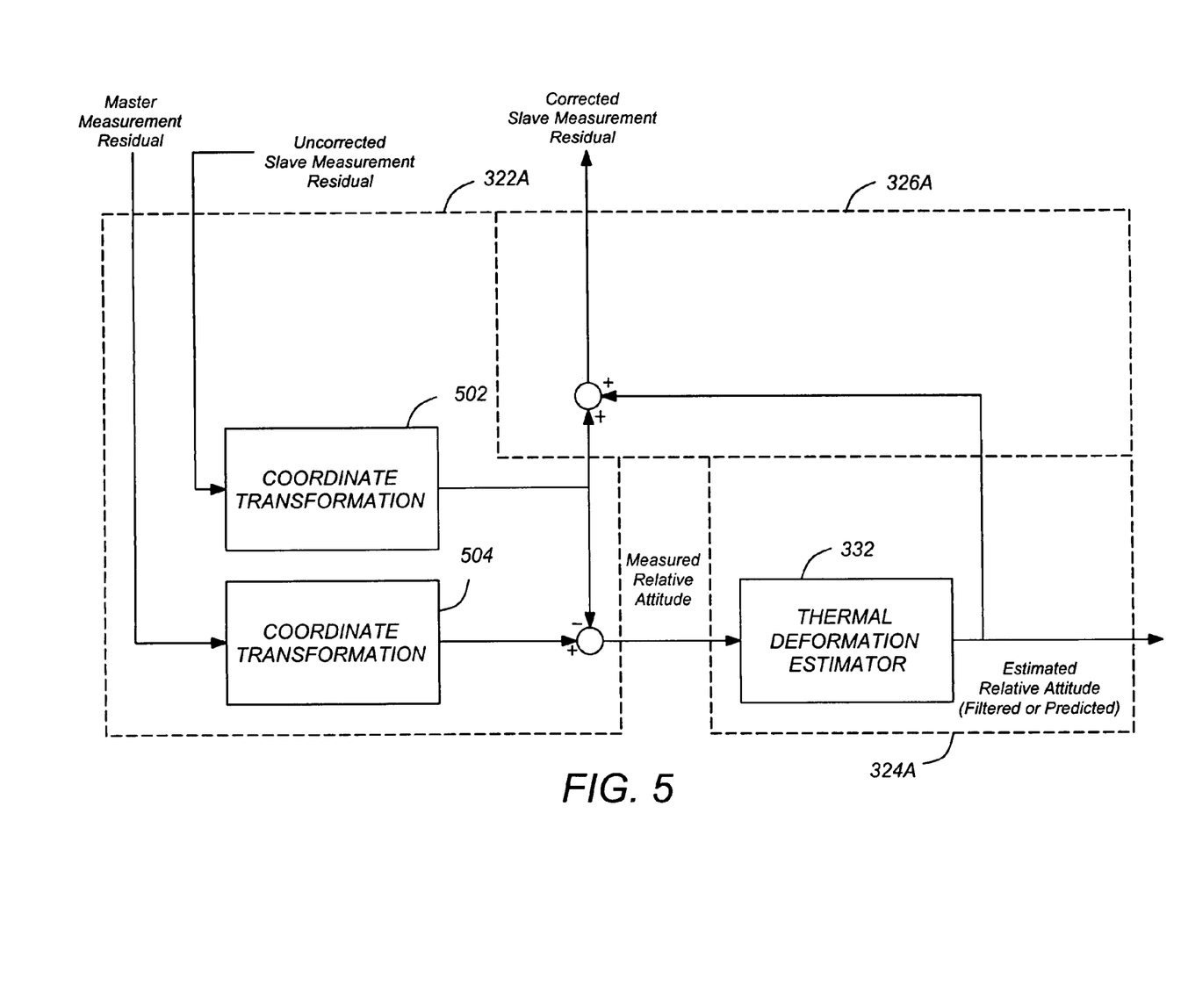
FIG. 5 is a diagram of one embodiment of the operation of a slave to master relative attitude generator and a relative attitude estimator.

FIG. 5 is a block diagram of one embodiment of the operation of the slave to master relative attitude generator 322A, the relative attitude estimator 324A, and the residual output corrector 326A. The uncorrected slave measurement residuals are provided to a coordinate transformer 502. The transformed uncorrected slave measurement residuals are added to the estimated relative attitude from the relative attitude estimator 324A and provided as the corrected slave sensor residual for master payload attitude determination. The master sensor residuals are provided to a coordinate transformer 504. The transformed slave sensor residuals are subtracted from the transformed master sensor residuals, to produce the measured relative attitude. The measured relative attitude is provided to the relative attitude estimator 324A, which provides an estimate of the attitude of the slave payload 116 relative to the master payload 112. The relative attitude estimator may include a thermal deformation estimator 332, as shown.

Figure 6:
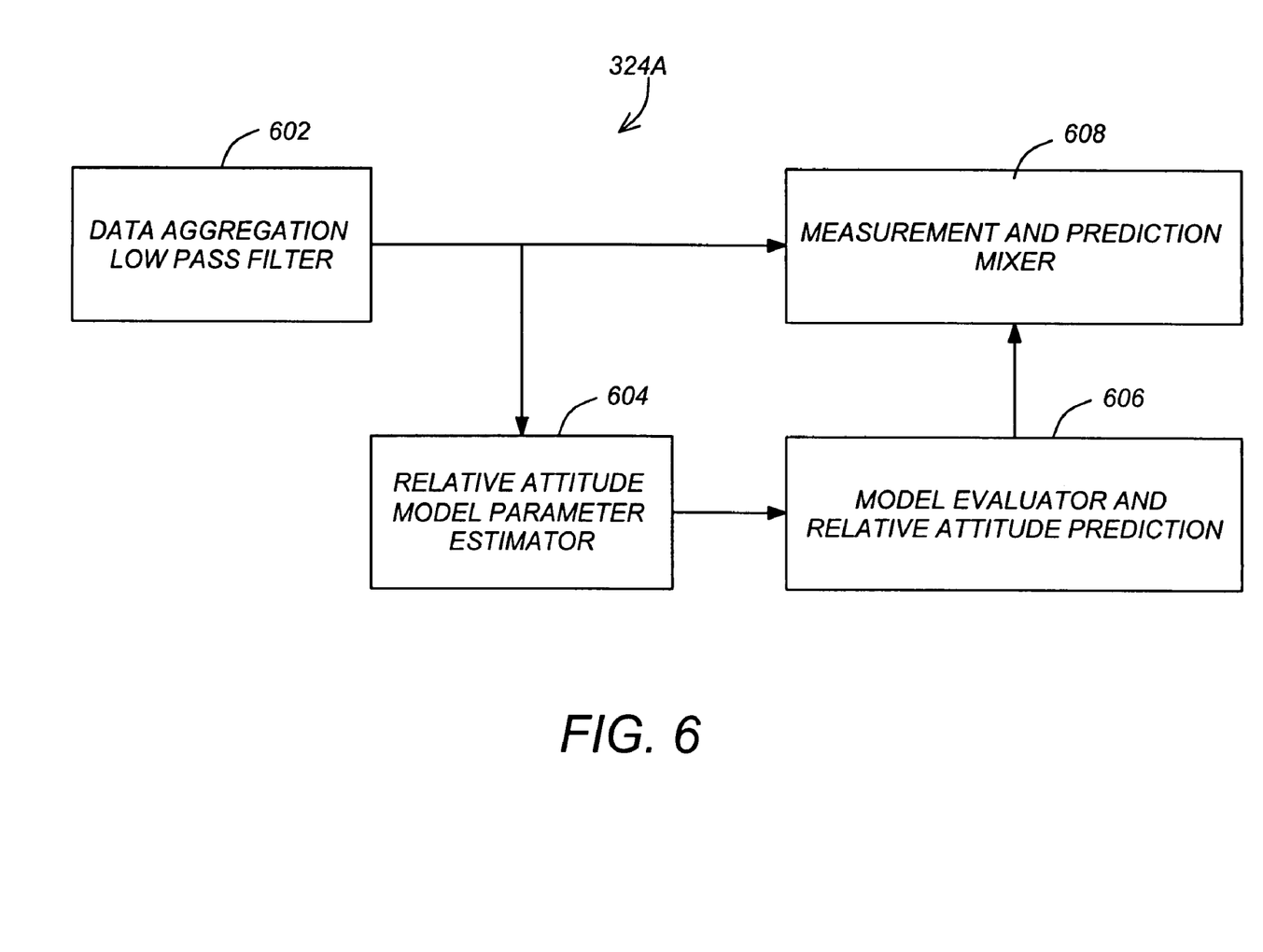
FIG. 6 is a diagram of one embodiment of the relative attitude estimator.

FIG. 6 is a block diagram of one embodiment of the relative attitude estimator 324A. The relative attitude estimator 324A includes a filter 602. While not necessary to practice the present invention, the filter 602 low pass-filters or otherwise averages down the raw relative attitude measurements. In one embodiment, the measurements of the relative attitude are derived from attitude sensor measurements that are available at relatively high rates (e.g. 1 Hz). The relative attitude, however, changes much more slowly, typically at 1/100 Hz. Since it is usually unnecessary for the relative attitude estimator 324A to provide data at that rate, the processing of all of these measurements is not typically necessary. To save computer throughput, the "raw" relative attitude measurements passed through the filter 602 to reduce the number of data points, and processing in the remaining blocks shown in FIG. 6 (blocks 604, 606, and 608) are performed at a much lower update rate. The filter 602 aggregates the high-sampling-ratedata to be low-sampling-ratedata, and anti-alias filters the data so the data can be processed at lower sampling rates. In one embodiment, the filter 602 is a simple low pass filter or a "sum and dump" average-down filter.

The model parameter estimator 604 fits the low-pass filtered data to parametric models of the expected relative attitude. Changes in the relative attitude of the slave payload are primarily due to the thermal deformation of the payload and supporting structures as the satellite rotates around the Earth, entering and leaving the Earth's shadow. Consequently, the relative attitude changes are typically periodic, specifically dinural. The relative attitude profile over an orbit is separated into segments and each segment is modeled by a function. In one embodiment, the function is formed by a set of base functions, and can include a polynomial, a Taylor series, or a Fourier series. In a representative embodiment, the orbit is divided into 24 segments, each of one hour time duration, and each segment is modeled by a $3^{rd}$ order polynomial. In the degenerate case of N=1, the profile over the entire orbit can be represented by one segment and, for example, by a high-order Fourier series.

This "segmented" design promotes computational efficiency because the segmentation can be pre-determined, and because there are a limited number of segment types, the most computationally expensive part of the model parameter estimation can be completed for each segment type in advance.

Figure 7:
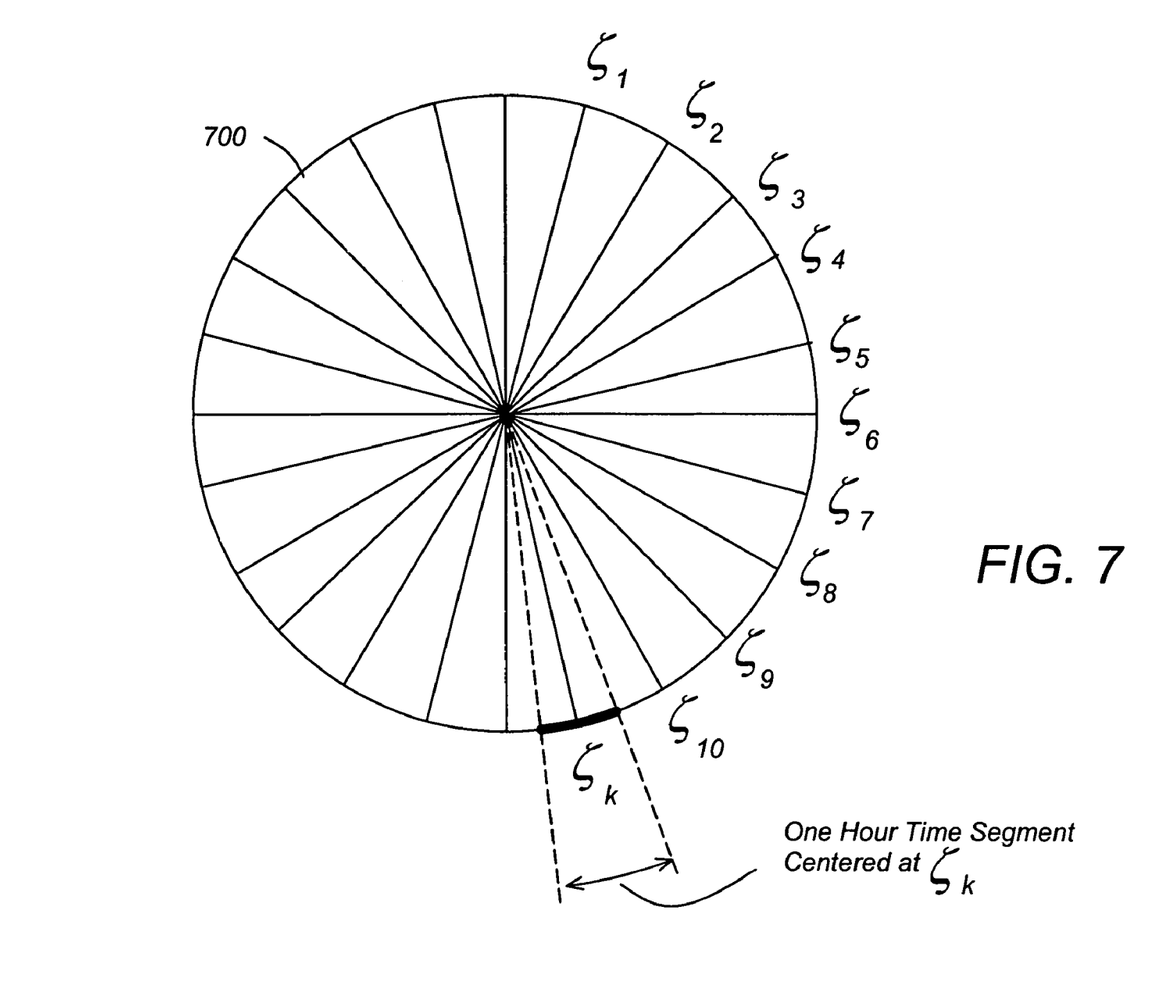
FIG. 7 is a diagram of an exemplary segmented relative attitude model.

FIG. 7 is a diagram illustrating an example of a segmented relative attitude model. N pre-assigned, equally spaced "center points" $\zeta_1, \zeta_2, \ldots, \zeta_N$ of the orbit 700 in time or in true anomaly, are identified over the entire orbit or over the eclipse region of the orbit (the period when the spacecraft 100 is shaded from the Sun by the Earth). In the illustrated embodiment, the entire orbit is separated into N=24 segments, each having a duration of an hour.

In one embodiment, the relative attitude for each segment can be represented by equation (1) below:

$$\delta\theta_k(\zeta) = \sum_i a_{k,i}\phi_i(\zeta - \zeta_k) \qquad \text{Eq. (1)}$$

where $\zeta$ is a variable that can be used to determine the spacecraft 100 location in the orbit 700, $\zeta_k$ is the value of the variable at the center of segment k, and $\phi_i(\bullet)$ describes a set of base functions. Examples of the variable $\zeta$ include the spacecraft 100 local time, true anomaly, or mean anomaly. Examples of the function set $\phi_i(\bullet)$ include polynomial power functions, sine/cosine functions or a Fourier series.

For example, the polynomial may be a third order polynomial such as described in equation (2) having coefficients $a_{k0}, a_{k1}, a_{k2}, a_{k3}$ below:

$$\mu_k = a_{k0} + a_{k1}(\zeta - \zeta_k) + a_{k2}(\zeta - \zeta_k)^2 + a_{k3}(\zeta - \zeta_k)^3 \qquad \text{Eq. (2)}$$

For each segment centered around the center point of the segment, there are m measurements, j=1, 2, . . . , m:

$$\delta\zeta(j) = (\zeta(j) - \zeta_k) \in \left[-\frac{\Delta}{2}, \frac{\Delta}{2}\right], \qquad \text{Eq. (3)}$$

Wherein $\Delta$ represents the dispersion around the center point of the segment. This yields the following equations:

$$\mu_k(j) = a_{k0} + a_{k1}\delta\zeta(j) + a_{k2}\delta\zeta(j)^2 + a_{k3}\delta\zeta(j)^3 \qquad \text{Eq. (4)}$$

$$= [1 \ \delta\zeta(j) \ \delta\zeta(j)^2 \ \delta\zeta(j)^3] \begin{bmatrix} a_{k0} \\ a_{k1} \\ a_{k2} \\ a_{k3} \end{bmatrix}$$

$$= h^T(\delta\zeta(j))A_k$$

wherein $h^T$ is a formed curve-fitting vector, $A_k$ is a parameter vector for segment k to be computed by equation (6), and $$Y_k = \begin{bmatrix} \vdots \\ \mu_k(j) \\ \vdots \end{bmatrix} = \begin{bmatrix} \vdots \\ h^T(\delta\zeta(j)) \\ \vdots \end{bmatrix} A_k = HA_k \quad \text{Eq. (5)}$$

The linear algebraic Eq. (5) is over-determined, therefore, the model parameters can be estimated, for example, using a least square solution given below, $$\hat{A} = H^+ Y_k = \text{pinv}(H) Y_k \quad \text{Eq. (6)}$$

wherein $Y_k$ represents the "m" relative attitude measurements in the segment, and H is the formed curve-fitting matrix.

For each segment, for example, a number of measurements over that segment are used to compute a fit to a third order polynomial by solving equation (6) for $\hat{A}$, the coefficients of the third order polynomial. In solving equation (6) for $\hat{A}$, it is worthwhile to note that pinv(H), the pseudo inverse of H, is a constant matrix (not a function of the measurement data) that can be pre-determined when the spacecraft 100 is designed. If desired, pinv(H) can be implemented in a programmable read only memory (PROM), or in a random access memory (RAM) that can be updatable from the ground. It is also noteworthy that $\hat{A}$ computation can be made recursive.

Figure 8:
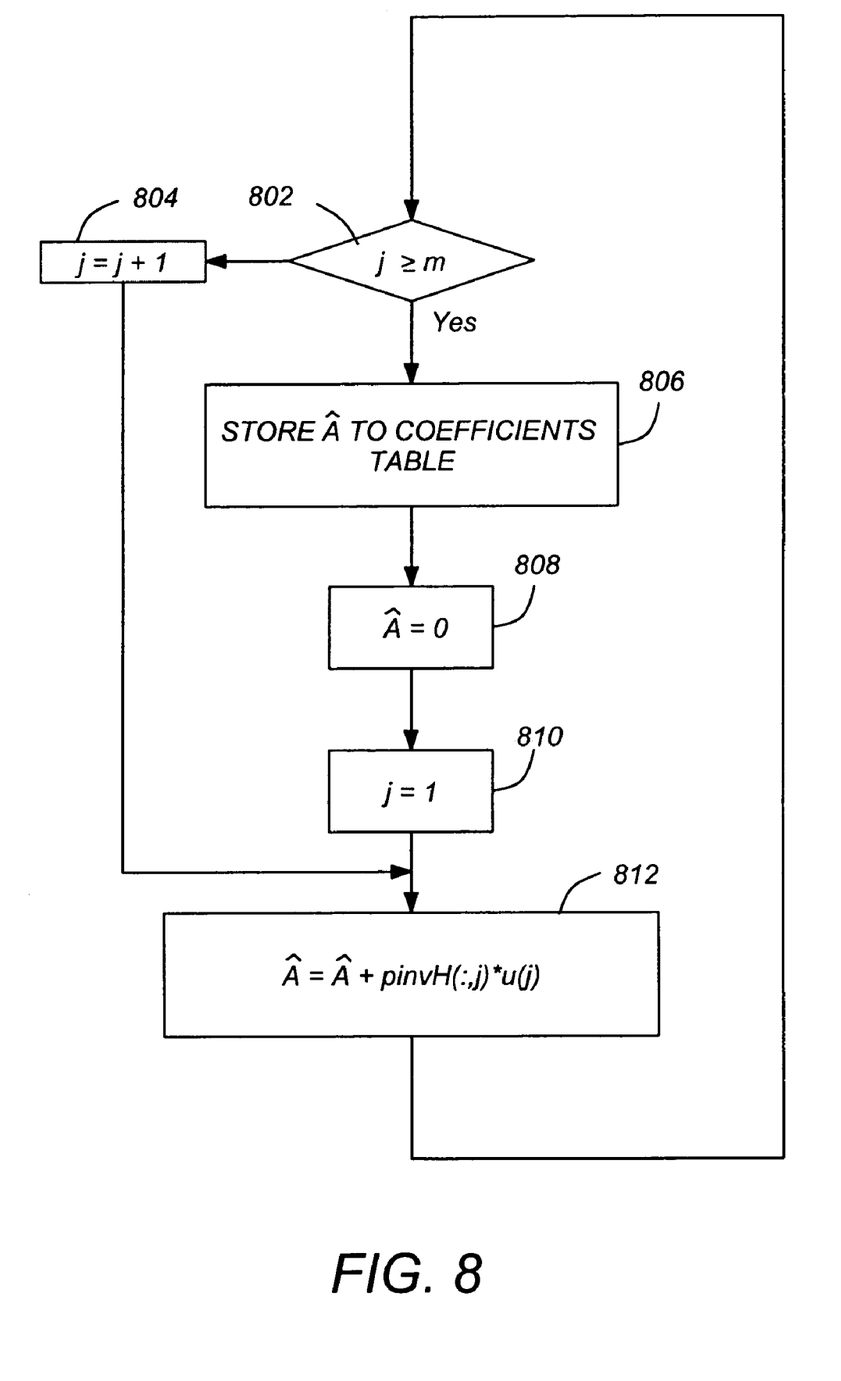
FIG. 8 is a flow chart showing how the computation of the coefficients of the relative attitude model can be recursively computed.

FIG. 8 is a flow chart showing how the computation of $\hat{A}$ can be implemented in recursive form. Block 802 determines if a new time segment has started by checking if a counter j is greater than or equal to m. If not, the counter is incremented, and processing proceeds directly to block 812. If the counter j exceeds m, the values of $\hat{A}$ (representing the polynomial coefficients) is stored in a table, as shown in block 806. Next, in block 808, the values of $\hat{A}$ are reset to zero, and the counter j is reset to "1", as shown in blocks 810. Then, the value of $\hat{A}$ is determined from the relationship described in equation (7) below, as shown in block 812.

$$\hat{A} = \hat{A} + \text{pinv}H(:,j) \cdot u(j) \quad \text{Eq. (7)}$$

If the data made available by the filter 602 is provided every minute, the curve fit will use m=60 data points. Matrix inversions required to compute the coefficients can be pre-computed, and the remaining curve-fit computations can be completed with reduced processing and storage requirements. For example, in the above case, the memory requirement for the pinvH matrix is a total of 120 floating-point elements, and the same matrix can be used for normal (non-eclipse) and eclipse mode types, and with the roll and pitch channels. Regarding the coefficients table described above, the storage of one table each for roll and pitch channels for the normal mode type for 24 segments requires a total of 192 floating-point elements.

The model evaluator/predictor 606 predicts the relative attitude of the slave payload relative to the master payload using the model derived in block 604, and the measurement and prediction mixer or estimator module 608 mixes the current relative attitude measurement and the predicted relative attitude to generate an estimate of the relative attitude.

Figure 9:
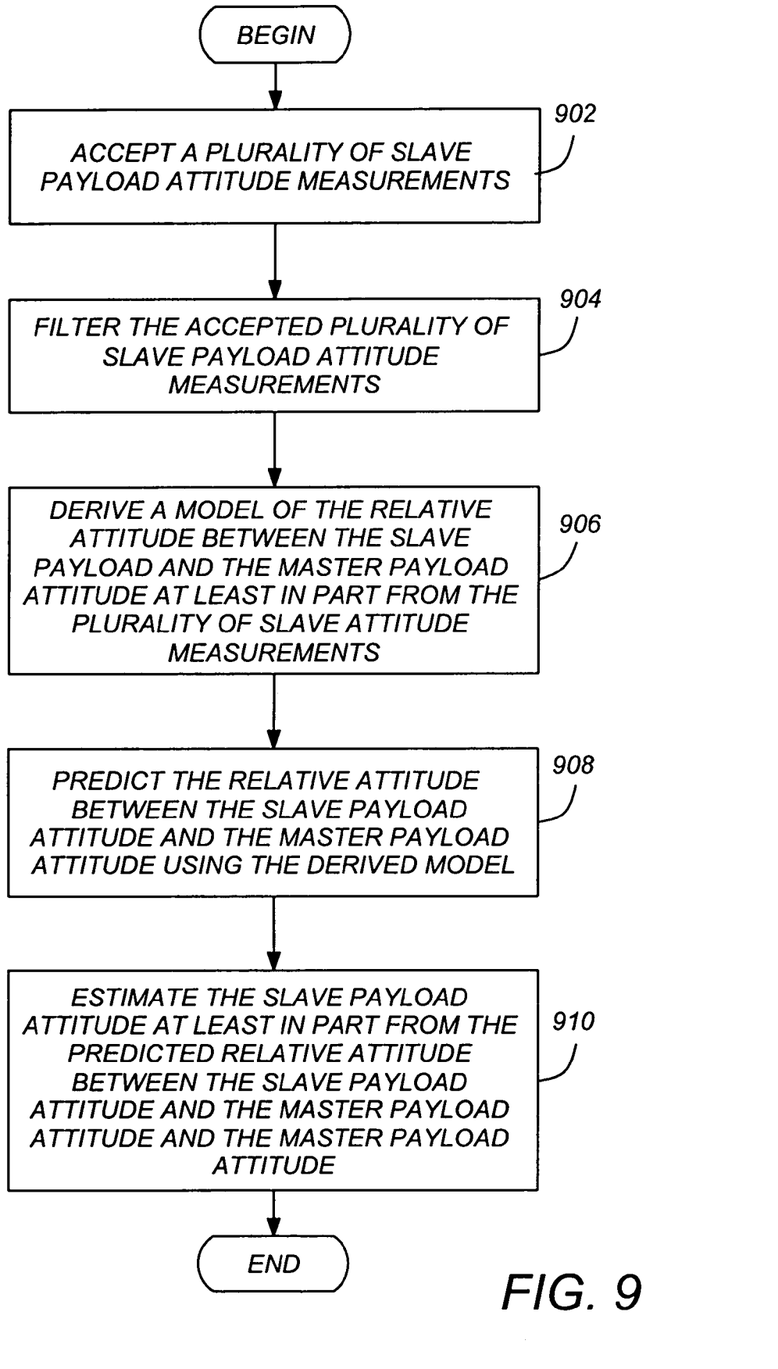
FIG. 9 is a flow chart illustrating process steps that can be used to practice one embodiment of the invention.

FIG. 9 is a flow chart illustrating exemplary process steps that can be used to practice one embodiment of the present invention. In block 902, a plurality of slave payload attitude measurements are accepted. The plurality of accepted slave payload measurements are then filtered, as shown in block 904. The filtered plurality of slave measurements are used to derive a model of the relative attitude between the slave payload and the master payload, as shown in block 906. In one embodiment this is accomplished by fitting the plurality of slave payload attitude measurements to a parametric model of the relative attitude between the spacecraft payloads. As described above, this model can be separated into segments, each having a segment model of the relative attitude between the spacecraft payloads.

Figure 10:
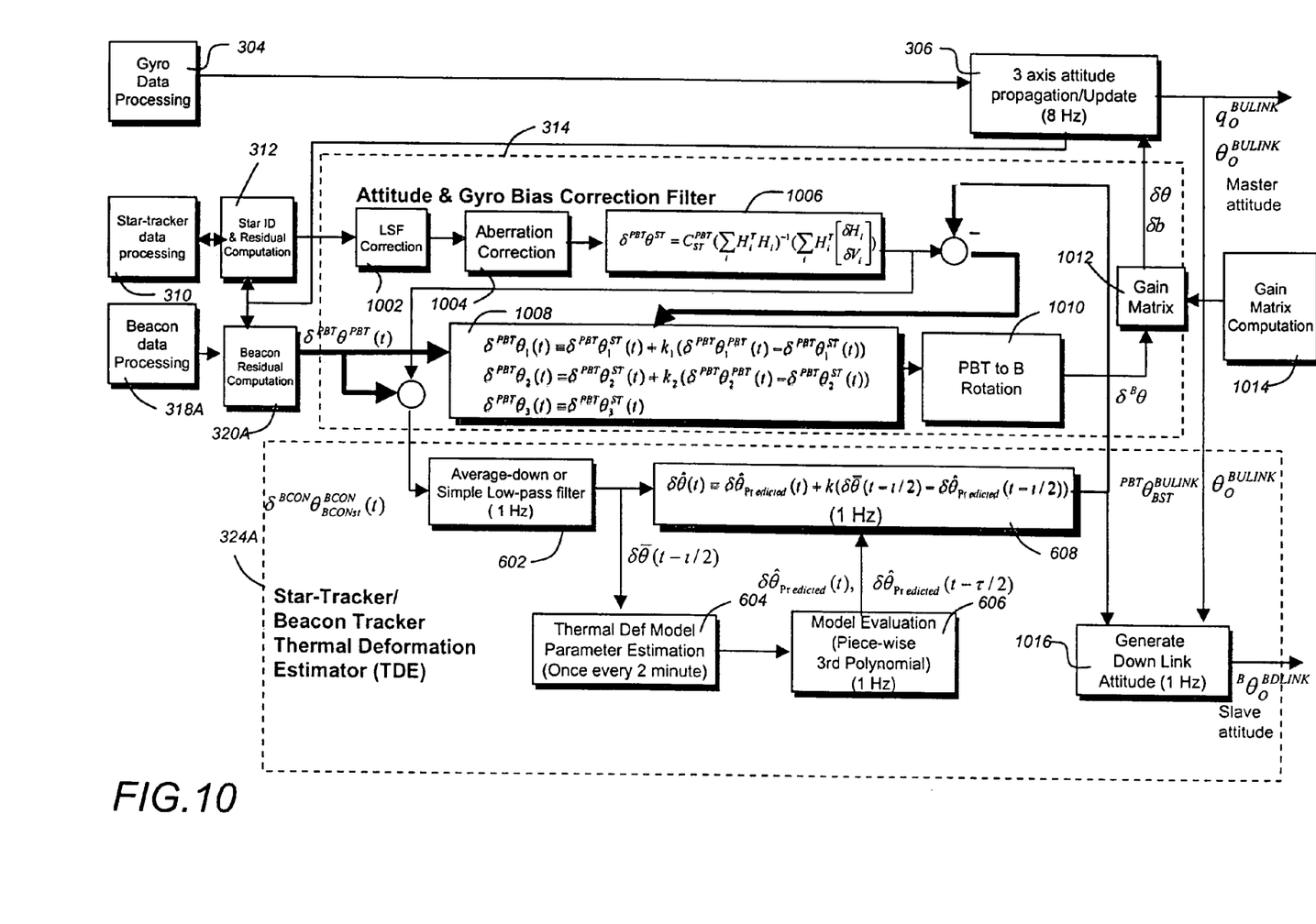
FIG. 10 is a diagram showing an exemplary application of the present invention.

FIG. 10 is a diagram showing an exemplary application of the present invention. In this embodiment, the master payload includes a beacon sensor, and the slave payload includes a star tracker. As described earlier in FIG. 3, gyro measurements are processed by the gyro data processing block 304, and provided to an attitude propagation module 306. In this embodiment, the attitude propagation module 306 provides propagated attitude at an 8 Hz rate.

The slave payload sensor (here, the star tracker) data is processed by data processor 318A, and star tracker residuals are computed by measurement residual module 320A. Similarly, master payload sensor (here, the beacon sensor) data is processed by data processor 310 and the beacon residuals are computed by measurement residual module 312. These inputs are provided to the Attitude/Gyro Error Estimation Filter 314. The star tracker measurement residuals are corrected for LSF (Low Spatial Frequency) errors and aberration errors by LSF corrector 1002 and aberration corrector 1004, and provided to a coordinate transformation.

The star position residual is related to the attitude residual through equation (8) below:

$$\begin{bmatrix} \delta H_k \\ \delta V_k \end{bmatrix} = -(^{ST}V_k \times)(1:2,:) \begin{bmatrix} \delta^{ST}\theta_x^{ST} \\ \delta^{ST}\theta_y^{ST} \\ \delta^{ST}\theta_z^{ST} \end{bmatrix} + N_k \equiv H_{1k} \begin{bmatrix} \delta^{ST}\theta_x^{ST} \\ \delta^{ST}\theta_y^{ST} \\ \delta^{ST}\theta_z^{ST} \end{bmatrix} + N_k \quad \text{Eq. (8)}$$

wherein $\delta H_k$ is a star position residual in the star tracker horizontal direction), $\delta V_k$ is a star position residual in the tracker vertical direction, $^{ST}V_k$ is the star tracker boresight unit vector, $$\delta^{ST}\theta_{x,y,z}^{ST}$$

is an attitude residual in the star tracker x, y, and z coordinate directions, $N_k$ is the star tracker measurement noise, and $H_{1k}$ is the formed star tracker measurement matrix.

Consequently, with sufficient number of star position measurements, $\delta U_k^m$, the attitude residual in the star tracker sensor frame can be computed from the star position residuals according to equation (9):

$$\delta^{ST}\theta^{ST} = \left(\sum_k H_{1k}^T H_{1k}\right)^{-1} \left(\sum_k H_{1k}^T \delta U_k^m\right) = Z\left(\sum_k H_{1k}^T \delta U_k^m\right) \quad \text{Eq. (9)}$$

Equation (9) can be transformed into the beacon sensor (PBT) frame as shown in equation (10):

$$\delta^{PBT}\theta^{ST} = C_{ST}^{PBT}\delta^{ST}\theta^{ST} \qquad \text{Eq. (10)}$$

Wherein $\delta^{PBT}\theta^{ST}$ is the attitude residual in beacon sensor frame as determined by star measurement, and $$C_{ST}^{PBT}$$

is the coordinate transformation between the beacon sensor coordinate frame and the star sensor coordinate frame.

This relationship is used to transform star tracker residuals in the star tracker sensor coordinate frame to the beacon sensor coordinate frame in block 1006. Once transformed, the star tracker residuals are differenced with the beacon residuals, and the result, $$\delta^{BCON}\theta_{BCON_{St}}^{BCON}(t)$$

(relative attitude error residual in beacon sensor frame as determined by that measured by beacon sensor and that measured by star tracker) is provided to the relative attitude estimator 324A.

The relative attitude estimator 324A includes a filter 602, which averages the relative attitude error residual $$\delta^{BCON}\theta_{BCON_{St}}^{BCON}(t)$$

data from approximately 1 second down to approximately 1 minute to produce an average relative attitude error $$\delta\overline{\theta}\left(t-\frac{\tau}{2}\right),$$

wherein $\delta\overline{\theta}$ is the average relative attitude error, t is a time variable and $\tau$ is a variable representing the averaging length of 1 minute. The averaged down data is provided to a parameter estimation module 604, which, using the techniques described above, generates the coefficients of a third order polynomial such as that which is described in equation (7). Note that in the eclipse mode, the parameter estimation model 604 and the model evaluation/prediction may be implemented differently to enhance accuracy. The coefficients are used by the model evaluator/predictor 606 to generate predicted relative attitude errors $$\delta\hat{\theta}_{Predicted}(t), \delta\hat{\theta}_{Predicted}\left(t-\frac{\tau}{2}\right),$$

the resulting predicted relative attitude errors are combined with the averaged down measurement residuals according to equation (11), below:

$$\delta\hat{\theta}(t) = \delta\hat{\theta}_{Predicted}(t) + k\left(\delta\overline{\theta}\left(t-\frac{\tau}{2}\right) - \delta\hat{\theta}_{Predicted}\left(t-\frac{\tau}{2}\right)\right) \qquad \text{Eq. (11)}$$

to produce an estimate of the relative attitude in the beacon sensor coordinate frame, $$^{PBT}\theta_{BST}^{BULINK}.$$

The estimated relative attitude can be used to gimbal an antenna, to electronically steer a phase array, or to digitally steer formed beams to compensate for the attitude error due to the thermal deformation. This value of relative attitude is subtracted from the star position residuals, transformed into the beacon coordinate frame by block 1006, and provided to block 1008, which mixes the beacon attitude residuals and the corrected star tracker residuals in the beacon coordinate frame. The resulting mixed beacon and star tracker residuals are transformed from the beacon (PBT) frame to the spacecraft body frame (B) by block 1010 to produce a master payload attitude residual $\delta^B\theta$. This is provided to a gain matrix 1012, which performs an attitude and gyro correction computation according to a computed gain matrix provided by block 1014, thus producing attitude and gyro corrections $\delta\theta$ and $\delta b$. This information is provided to the attitude propagation module 306 to update master payload attitude quaternion $q_o^{BULINK}$. Furthermore, the attitude of salve payload can be computed by block 1016 using relative attitude computed in block 608 and master payload attitude $\theta_0^{BULINK}$ computed in block 306.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing description uses "master" and "slave" designations to refer to attitude sensors and payloads, it is noted that such designations are arbitrary, and the present invention can be practiced by designating any arbitrary payload/attitude sensor as the "master" payload/attitude sensor, and other payloads/attitude sensors as "slave" payloads/attitude sensors. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of estimating a slave payload attitude, comprising the steps of:
   accepting a plurality of slave payload attitude measurements;
   deriving a model of the relative attitude between the slave payload attitude and a master payload attitude at least in part from the plurality of slave attitude measurements;

predicting the relative attitude between the slave payload attitude and the master payload attitude using the derived model; and estimating the slave payload attitude at least in part from the predicted relative attitude between the slave payload attitude and the master payload attitude.

2. The method of claim 1, wherein the master payload attitude is determined at least in part from at least one gyro.

3. The method of claim 1, wherein the slave payload attitude is determined at least in part from a slave payload attitude sensor.

4. The method of claim 3, further comprising the step of filtering the accepted plurality of slave payload attitude measurements.

5. The method of claim 1, wherein the step of deriving a model of the relative attitude of the slave payload from the plurality of slave attitude measurements comprises the step of:

fitting the plurality of slave attitude measurements to a parametric model of the relative attitude of the slave payload.

6. The method of claim 5, wherein the model of the relative attitude of the slave payload is determined in segments.

7. The method of claim 5, wherein the model of the relative attitude of the slave payload comprises a plurality of segment models, each segment model representing a model of the relative attitude of the slave payload for a segment.

8. The method of claim 7, wherein:

each of the segment models represent a model of the relative attitude of the slave payload for a time segment of one hour duration.

9. The method of claim 7, wherein:

each segment model models the relative attitude of the slave payload according to a function selected from the group comprising:
a polynomial;
a Taylor series; and
a Fourier series.

10. The method of claim 7, wherein:

the relative attitude is represented by a relation $$\delta\theta(\zeta) = \sum_i a_{k,i}\phi_i(\zeta - \zeta_k),$$

wherein $\zeta$ is a variable that indicates the spacecraft location in orbit, $\zeta_k$ is a center of time segment k, and $\phi_i(\bullet)$ represents a base function, and $a_{k,i}=a_{0,i},a_{1,i}, \ldots ,a_{N,i}$ are model parameters estimated by relative attitude measurements.

11. The method of claim 10, wherein the base function is selected from the group comprising:
a polynomial;
a Taylor series; and
a Fourier series.

12. An apparatus for estimating a slave payload attitude, comprising: means for accepting a plurality of slave payload attitude measurements;

means for deriving a model of the relative attitude between the slave payload attitude and a master payload attitude at least in part from the plurality of slave attitude measurements;

means for predicting the relative attitude between the slave payload attitude and the master payload attitude using the derived model; and means for estimating the slave payload attitude at least in part from the predicted relative attitude between the slave payload attitude and the master payload attitude.

13. The apparatus of claim 12, wherein the master payload attitude is determined at least in part from at least one gyro.

14. The apparatus of claim 12, wherein the slave payload attitude is determined at least in part from a slave payload attitude sensor.

15. The apparatus of claim 14, further comprising means for filtering the accepted plurality of slave payload attitude measurements.

16. The apparatus of claim 12, wherein the means for deriving a model of the relative attitude of the slave payload from the plurality of slave attitude measurements comprises the step of:

fitting the plurality of slave attitude measurements to a parametric model of the relative attitude of the slave payload.

17. The apparatus of claim 16, wherein the model of the relative attitude of the slave payload is determined in segments.

18. The apparatus of claim 16, wherein the model of the relative attitude of the slave payload comprises a plurality of segment models, each segment model representing a model of the relative attitude of the slave payload for a segment.

19. The apparatus of claim 18, wherein:

each of the segment models represent a model of the relative attitude of the slave payload for a time segment of one hour duration.

20. The apparatus of claim 18, wherein:

each segment model models the relative attitude of the slave payload according to a function selected from the group comprising:
a polynomial;
a Taylor series; and
a Fourier series.

21. The apparatus of claim 18, wherein:

the relative attitude is represented by a relation $$\delta\theta(\zeta) = \sum_i a_{k,i}\phi_i(\zeta - \zeta_k),$$

wherein $\zeta$ is a variable that indicates the spacecraft location in orbit, $\zeta_k$ is a center of time segment k, and $\phi_i(\bullet)$ represents a base function, and $a_{k,i}=a_{0,i},a_{1,i}, \ldots ,a_{N,i}$ are model parameters estimated using relative attitude measurements.

22. The apparatus of claim 21, wherein the base function is selected from the group comprising:
a polynomial;
a Taylor series; and
a Fourier series.

23. An apparatus for estimating a slave payload attitude, comprising:

a sensor processing module for accepting a plurality of slave payload attitude measurements;

a relative attitude model parameter estimator, communicatively coupled to the sensor processing module, for deriving a model of the relative attitude between the slave payload attitude and a master payload attitude at least in part from the plurality of slave attitude measurements;

a predictor module, communicatively coupled to the relative attitude model parameter estimator, for predicting the relative attitude between the slave payload attitude and the master payload attitude using the derived model; and an estimator module, communicatively coupled to the predictor module and sensor processing module, for estimating the slave payload attitude at least in part from the predicted relative attitude between the slave payload attitude and the master payload attitude.

24. The apparatus of claim 23, wherein the master payload attitude is determined at least in part from at least one gyro.

25. The apparatus of claim 23, wherein the slave payload attitude is determined at least in part from a slave payload attitude sensor.

26. The apparatus of claim 25, further comprising a filter for filtering the accepted plurality of slave payload attitude measurements.

27. The apparatus of claim 23, wherein the relative attitude model parameter estimator comprises:
a curve fitting module for fitting the plurality of slave attitude measurements to a parametric model of the relative attitude of the slave payload.

28. The apparatus of claim 27, wherein the model of the relative attitude of the slave payload is determined in segments.

29. The apparatus of claim 27, wherein the model of the relative attitude of the slave payload comprises a plurality of segment models, each segment model representing a model of the relative attitude of the slave payload for a segment.

30. The apparatus of claim 29, wherein:
each of the segment models represent a model of the relative attitude of the slave payload for a time segment of one hour duration.

31. The apparatus of claim 29, wherein:
each segment model models the relative attitude of the slave payload according to a function selected from the group comprising:
a polynomial;
a Taylor series; and
a Fourier series.

32. The apparatus of claim 29, wherein:
the relative attitude is represented by a relation $$\delta\theta(\zeta) = \sum_i a_{k,i} \phi_i(\zeta - \zeta_k),$$

wherein $\zeta$ is a variable that indicates the spacecraft location in orbit, $\zeta_k$ is a center of time segment k, and $\phi_i(\bullet)$ represents a base function, and $a_{k,i} = a_{0,i}, a_{1,i}, \ldots, a_{N,i}$ are model parameters estimated using relative attitude measurements.

33. The apparatus of claim 32, wherein the base function is selected from the group comprising:
a polynomial;
a Taylor series; and
a Fourier series.

* * * * *